(12) United States Patent
Garduño Ramírez (10) Patent No.: US 11,898,687 B2
(45) Date of Patent: Feb. 13, 2024

(54) IMPACT ABSORBER ASSEMBLY

(71) Applicant: Ford Global Technologies, LLC, Dearborn, MI (US)

(72) Inventor: Ernesto Garduño Ramírez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 810 days.

(21) Appl. No.: 16/993,864

(22) Filed: Aug. 14, 2020

(65) Prior Publication Data

US 2022/0049811 A1    Feb. 17, 2022

(51) Int. Cl.
| | |
|---|---|
| *F16L 57/06* | (2006.01) |
| *F16F 1/376* | (2006.01) |
| *B60H 1/00* | (2006.01) |
| *F16F 1/37* | (2006.01) |

(52) U.S. Cl.
CPC .......... *F16L 57/06* (2013.01); *B60H 1/00571* (2013.01); *F16F 1/37* (2013.01); *F16F 1/376* (2013.01)

(58) Field of Classification Search
CPC ........ F16L 57/06; B60H 1/00571; F16F 1/37; F16F 1/376
USPC .......................................................... 296/208
See application file for complete search history.

(56) References Cited

U.S. PATENT DOCUMENTS

| | | | | |
|---|---|---|---|---|
| 898,882 A | * | 9/1908 | Hawkins ................. | F16L 57/06 285/179 |
| 1,211,784 A | * | 1/1917 | Stuart .................. | B65G 53/523 285/16 |
| 1,518,705 A | * | 12/1924 | Raun ....................... | F16L 57/06 138/173 |
| 2,297,483 A | * | 9/1942 | Kuhne .................... | F16F 1/376 267/270 |
| 3,151,905 A | * | 10/1964 | Reuther ................. | B60R 16/00 174/152 G |
| 3,979,142 A | * | 9/1976 | Fujisawa ............... | F16L 27/107 285/423 |
| 4,205,034 A | * | 5/1980 | Newberry .............. | B29C 53/82 264/171.18 |
| 4,212,328 A | * | 7/1980 | Yamamoto ............ | F16L 11/133 138/133 |
| 4,766,662 A | * | 8/1988 | Bradshaw ............... | F01P 11/04 138/156 |

(Continued)

FOREIGN PATENT DOCUMENTS

| | | |
|---|---|---|
| CN | 203586496 U | 5/2014 |
| CN | 102797909 B | 6/2014 |

(Continued)

*Primary Examiner* — Hilary L Gutman
(74) *Attorney, Agent, or Firm* — Vichit Chea; Price Heneveld LLP (57) ABSTRACT

An apparatus that has a conduit and an impact absorber assembly. The impact absorber assembly includes a core and a frame, where the core has an aperture configured to receive the conduit and the frame includes a cavity sized and shaped to receive the core. The frame also has a first side wall and a second side wall that are spaced apart to define, at least in part, a cavity. The first and second side walls also include an intermediate portion that includes a waveform shape. The waveform shape includes at least a pair of ridges and a trough between the ridges.

16 Claims, 8 Drawing Sheets

(56) References Cited

U.S. PATENT DOCUMENTS

| | | | | |
|---|---|---|---|---|
| 4,842,024 A | * | 6/1989 | Palinchak | F16L 11/085 |
| | | | | 138/109 |
| 5,622,402 A | | 4/1997 | Pritchard et al. | |
| 5,653,475 A | * | 8/1997 | Scheyhing | F16L 37/144 |
| | | | | 285/379 |
| 2004/0060791 A1 | * | 4/2004 | Akiyama | F16F 1/37 |
| | | | | 188/377 |
| 2018/0258564 A1 | * | 9/2018 | Yamaguchi | F16L 11/111 |
| 2022/0065381 A1 | * | 3/2022 | Nester | F16L 57/06 |

FOREIGN PATENT DOCUMENTS

| | | | | |
|---|---|---|---|---|
| CN | 103940155 A | * | 7/2014 | B60H 1/00571 |
| CN | 204226864 U | | 3/2015 | |
| CN | 107512315 A | | 12/2017 | |
| FR | 2927978 A1 | * | 8/2009 | F16L 25/0036 |
| KR | 20150132633 A | * | 11/2015 | B60H 1/00571 |
| WO | WO-2004111518 A1 | * | 12/2004 | B65G 53/32 |

* cited by examiner

IMPACT ABSORBER ASSEMBLY

BACKGROUND

Technical Field

The present disclosure is directed to an impact absorber assembly provided in a vehicle.

Description of the Related Art

Vehicles include conduits that circulate fluids between various components or systems of the vehicle. The conduits are generally coupled to one or more components of certain vehicle units, e.g., an air conditioning unit, through fittings. These conduits and fittings may experience punctures, bending, or other undesirable loads under certain operational conditions.

BRIEF SUMMARY

The present disclosure relates to an impact absorber assembly that mitigates, restricts, or limits strains experienced by a conduit, fitting, or similar structure of a vehicle.

In one embodiment, an apparatus of the present disclosure includes a conduit and an impact absorber assembly. The impact absorber assembly includes a core having an aperture configured to receive the conduit. The impact absorber assembly further includes a frame having a first side wall and a second side wall that are spaced apart to define, at least in part, a cavity.

In one embodiment, an impact absorber assembly includes a core and a frame having a cavity sized and shaped to receive the core. The frame includes a first side wall and a second side wall each having an intermediate portion that includes a waveform shape.

In one embodiment, an apparatus that includes an air conditioning conduit of a vehicle and a fitting that is in fluid communication with the air conditioning conduit. The apparatus also includes an impact absorber assembly having a core that has an aperture to receive the air conditioning conduit. The impact absorber assembly also includes a frame having a cavity that is sized and shaped to receive the core. The frame includes a first side wall and a second side wall that is spaced apart to, at least in part, define a cavity.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
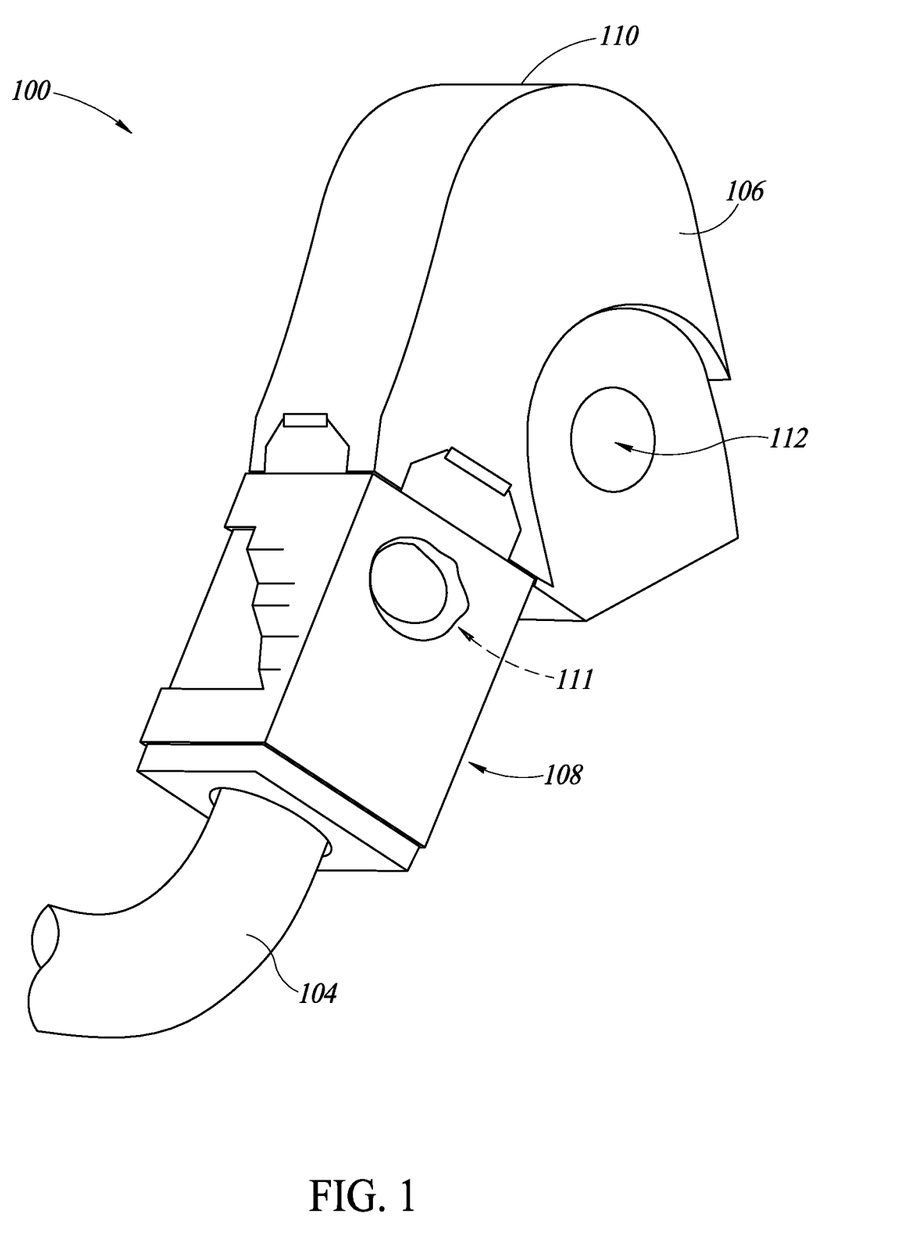
FIG. 1 is an isometric view of an apparatus, according to an embodiment of the present disclosure.

FIG. 1 illustrates an isometric view of an apparatus 100, according to an example embodiment. The apparatus 100 can be installed in a vehicle and can be included in various vehicular units, such as, for example, an air conditioning unit, a braking unit, an engine cooling unit, or any other suitable unit of the vehicle. The apparatus 100 includes a conduit 104, a fitting 106, and an impact absorber assembly 108 coupled to the conduit 104 and the fitting 106. In particular, the conduit 104 is coupled to the fitting 106 through the impact absorber assembly 108. The conduit 104, in some embodiments, can take the form of a pipe, hose, tube, and similar structures. Although not shown herein for the sake of clarity of illustration and description, the fitting 106 can couple the conduit 104 to one or more components of the vehicle.

For example, in one embodiment, the conduit 104 can take the form of an air conditioning conduit of a vehicle. The conduit 104 may be sized, shaped, and arranged to circulate coolants, refrigerants, or any other fluid, to various components of an air conditioning unit, such as a compressor, an evaporator, a radiator, a condenser, and other components. In some embodiments, as described above, the conduit 104 can be included in other vehicular units, such as, for example, a brake unit to circulate braking fluid to various components of a braking unit of a vehicle.

The conduit 104 is coupled to the fitting 106 and is in fluid communication with the fitting 106. In particular, the fitting 106 includes a main body 110 that includes a first aperture 111. The first aperture 111 is sized and shaped to coupleably receive the conduit 104. The fitting 106 also includes a second aperture 112. The second aperture 112 is sized and shaped to couple the fitting 106 to a component of a vehicular unit, such as, for example, a radiator, a compressor, or other similar components, as described above.

The impact absorber assembly 108 is generally sized and shaped to reduce, mitigate, or limit strains experienced by the conduit 104 or the fitting 106. For example, under certain circumstances during normal operation of the vehicle, the conduit 104 or the fitting 106 may come in contact with other proximate components due to vibrations or other movement caused by operation of the vehicle. As a result, the fitting 106 or the conduit 104 may experience undesired impact and bending. The impact absorber assembly 108 can reduce strains on the conduit 104 and the fitting 106. To that end, the impact absorber assembly 108 can absorb energy caused by the impact or bending.

Figure 2:
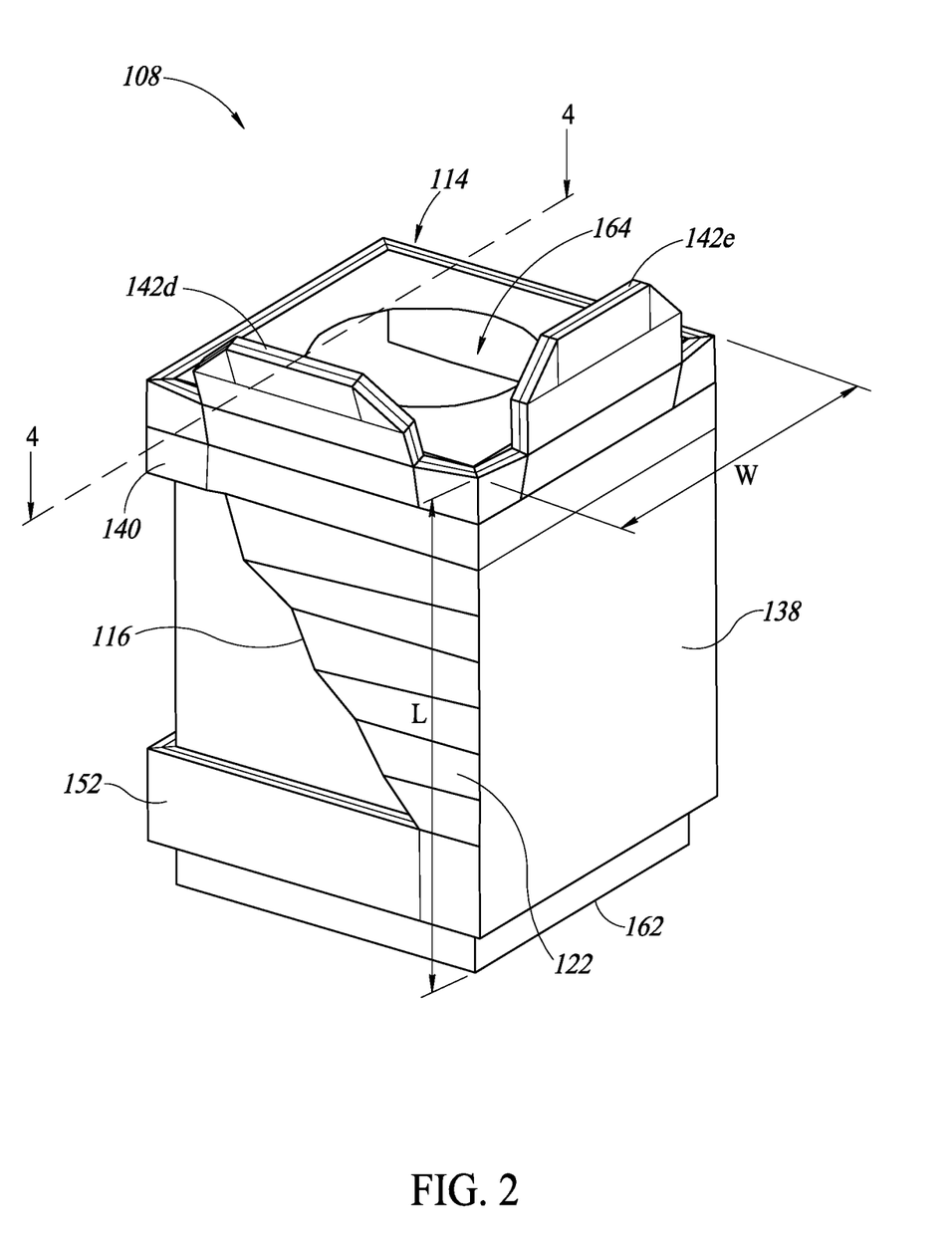
FIG. 2 is an isometric view of an impact absorber assembly of FIG. 1, according to an embodiment of the present disclosure.
Figure 3:
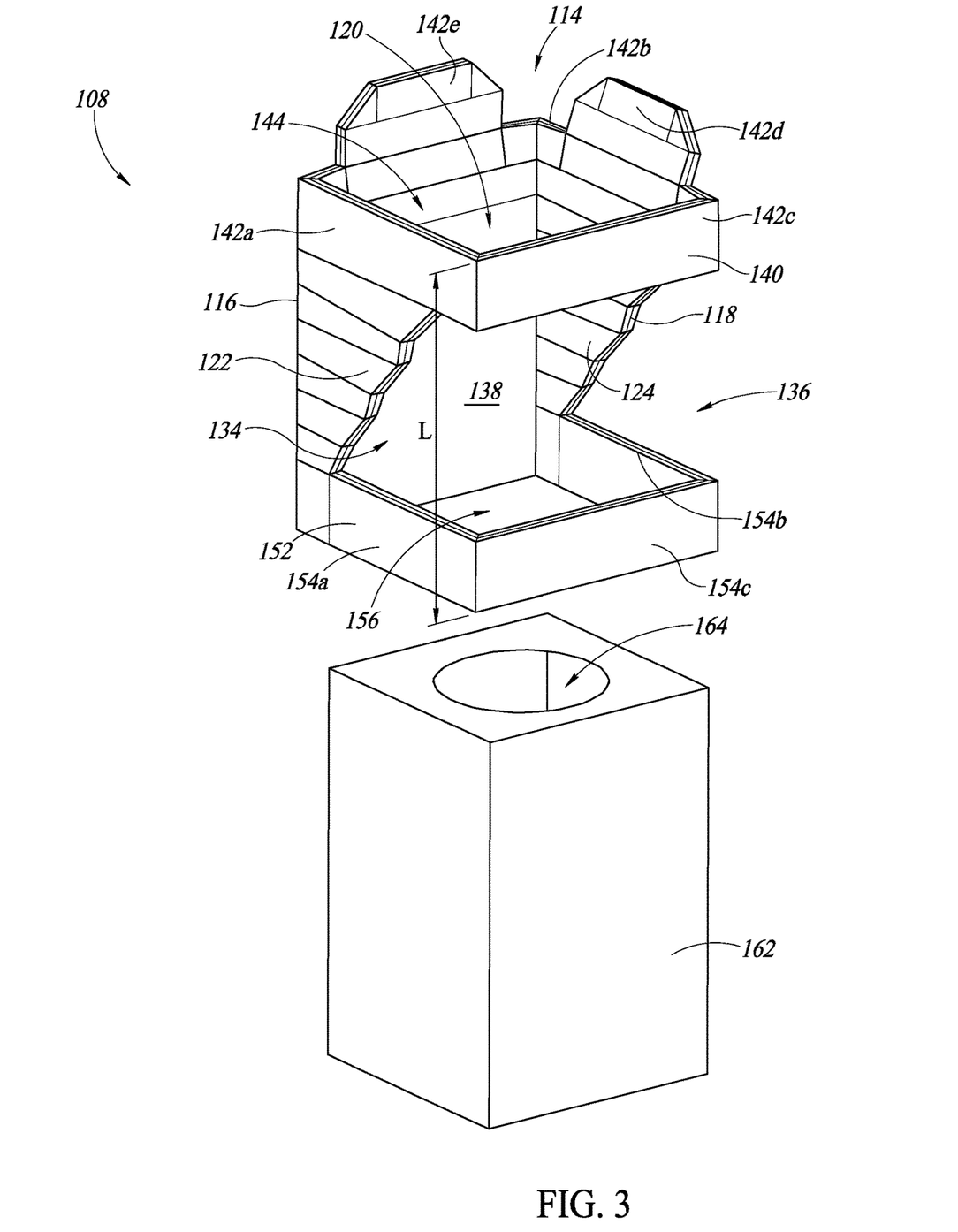
FIG. 3 is an exploded view of the impact absorber assembly of FIG. 2, according to an embodiment of the present disclosure.
Figure 4:
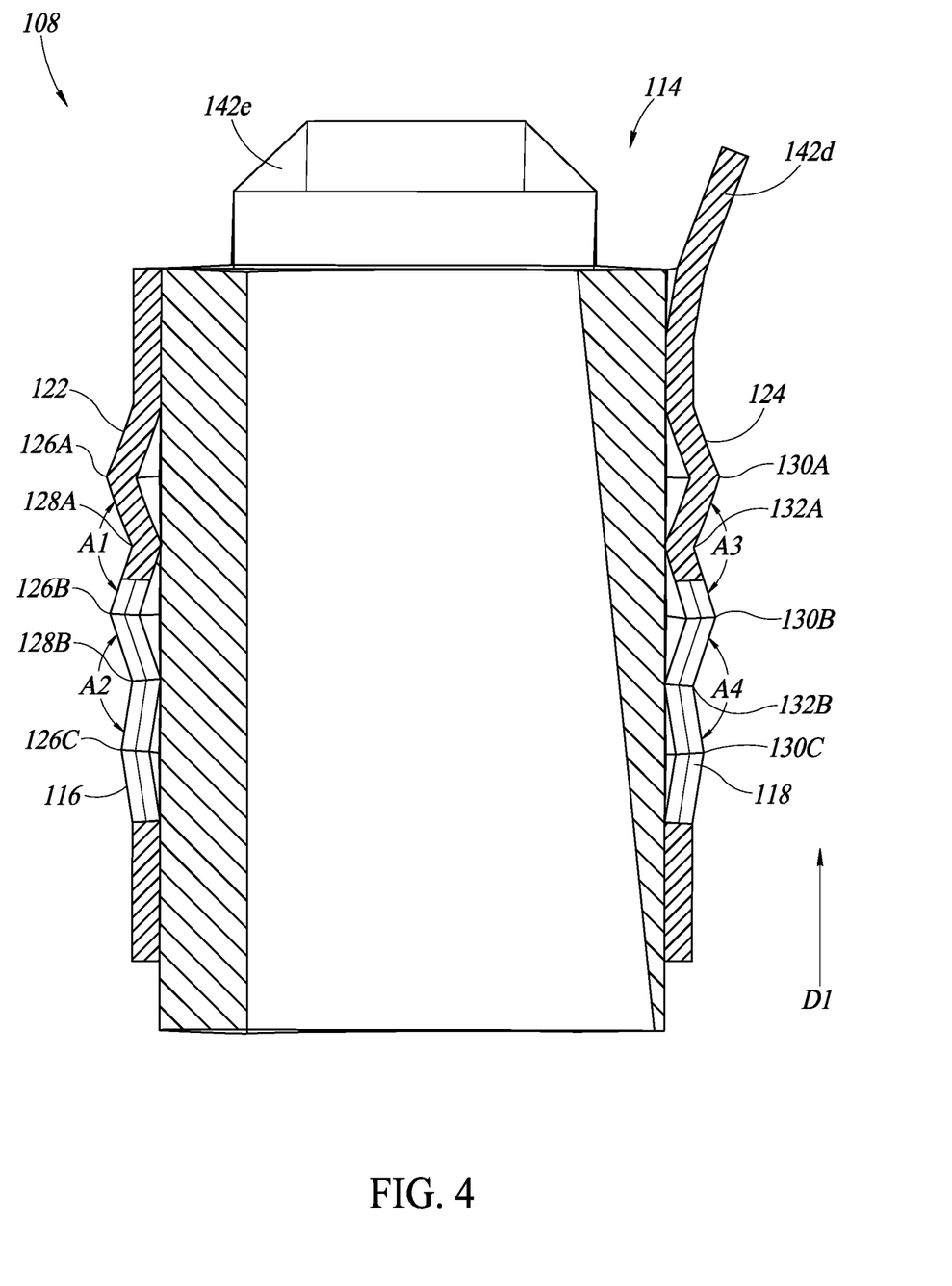
FIG. 4 is a cross-sectional view of the impact absorber assembly of FIG. 2, taken along line 4-4 of FIG. 2, according to an embodiment of the present disclosure.

FIGS. 2 to 4 illustrate various views of the impact absorber assembly 108, according to one example embodiment. In particular, FIG. 2 illustrates an isometric view of the impact absorber assembly 108 of FIG. 1, FIG. 3 illustrates an exploded view of the impact absorber assembly 108, and FIG. 4 illustrates a cross-sectional view of the impact absorber assembly 108 of FIG. 2, taken along line 4-4 of FIG. 2.

The impact absorber assembly 108 includes a frame 114 that forms an outer shell of the impact absorber assembly 108. The frame 114 couples the impact absorber assembly 108 to the fitting 106, as described in more detail below.

As shown in detail in FIGS. 2-4, the frame 114 includes a first side wall 116 and a second side wall 118 that is positioned opposite the first side wall 116. The first and second walls 116, 118 are generally similar to each other, and are spaced apart from each other, such that a distance between the first side wall 116 and the second side wall 118 defines a width W (FIG. 1) of the frame 114. Further, the first side wall 116 and the second side wall 118 also define a portion of a cavity 120 of the impact absorber assembly 108 provided in the frame 114.

In one embodiment, each of the first side wall 116 and the second side wall 118 includes, respectively, an intermediate portion that is configured to absorb, at least in part, the energy of the impact, as described in more detail below.

In particular, in one embodiment, the first side wall 116 has a first intermediate portion 122, which extends along a portion of a length L of the impact absorber assembly 108. The first intermediate portion 122 is sized and shaped such that a width of the first intermediate portion 122 proximate one end of the impact absorber assembly 108 gradually decreases as the first intermediate portion 122 approaches another, opposite end of the impact absorber assembly 108.

Similar to the first intermediate portion 122, the second side wall 118 includes a second intermediate portion 124, which also extends along a portion of the length L of the impact absorber assembly 108. The second intermediate portion 124 is generally parallel to the first intermediate portion 122, and is also sized and shaped such that a width of the second intermediate portion 124 proximate one end of the impact absorber assembly 108 gradually decreases as the second intermediate portion 124 approaches another, opposite end of the impact absorber assembly 108.

In one example embodiment, the first intermediate portion 122 and the second intermediate portion 124 each form a waveform shape. The waveform shape runs along a length of the first intermediate portion 122 and the second intermediate portion 124. In general, the waveform shape of each of the first and second intermediate portions 122, 124 facilitates the impact absorber assembly 108 to absorb, at least in part, energy during impact.

The waveform shape, in the illustrated embodiment, is formed by at least a pair of ridges and a trough between the pair of ridges. For example, as shown in FIG. 4, the waveform shape of the first intermediate portion 122 includes a first pair of ridges comprising of ridges 126A and 126B and a first trough 128A therebetween. In addition, the waveform shape includes a second pair of ridges comprising of ridges 126B and 126C and a second trough 128B therebetween. The ridges 126A, 126B and 126C are collectively referred to as ridges 126 and the troughs 128A and 128B are collectively referred to as troughs 128. Although the present embodiment illustrates three ridges 126 and two troughs 128, in some embodiments, the first and second intermediate portions 122, 124 can include additional or lesser number of ridges 126 and troughs 128.

Similarly, the waveform shape of the second intermediate portion 124 is formed by at least a pair of ridges and a trough therebetween. As shown in FIG. 4, the waveform shape of the second intermediate portion 124 includes a first pair of ridges comprising ridges 130A and 130B and a first trough 132A therebetween. In addition, the waveform shape includes a second pair of ridges comprising ridges 130B and 130C and a second trough 132B therebetween. The ridges 130A, 130B and 130C are collectively referred to as ridges 130 and the troughs 132A and 132B are collectively referred to as troughs 132.

In one embodiment, the ridges 126, 130 and their corresponding troughs 128, 132 are spaced apart angularly such that the the ridges 126, 130 and the troughs 128, 132 form a triangular-shaped waveform. For example, the ridge 126A is connected to the ridge 126B at the trough 128A such that the ridges 126A and 126B form an angle A1 at the trough 128A. Similarly, the ridge 126B is connected to the ridge 126C such that the ridges 126B and 126C form an angle A2 at the trough 128B. As shown in FIG. 4 in detail, the ridges 126 and troughs 128 form a continuous zig-zag shape that runs along the length of the first intermediate portion 122. Similarly, the second intermediate portion 124 includes the ridge 130A that is connected to the ridge 130B at the trough 132A such that the ridges 130A and 130B form an angle A3 at the trough 132A. Similarly, the ridge 130B is connected to the ridge 130C such that the ridges 130B and 130C form an angle A4 at the trough 132B. Again, the ridges 130 and troughs 132 form a continuous zig-zag shape that runs along the length of the second intermediate portion 124.

Thus, in the event of an impact, the ridges 126, 130 can change their angular orientation with respect to each other. For example, in case the impact is received along a direction D1, the ridges 126, 130 fold towards each other. In such a case, the angles A1, A2, A3, and A4 decrease as the ridges 126, 130 fold along the direction D1. Alternatively, in case the impact is received in a direction opposite to the direction D1, the ridges 126, 130 fold-away from each other thereby increasing the angles A1, A2, A3, and A4.

In one embodiment, each of the first side wall 116 and the second side wall 118 includes a recess to facilitate folding of the two intermediate portions 122 and 124 to absorb, at least in part, the energy of an impact. In particular, the first side wall 116 includes a first recess 134 adjacent to the first intermediate portion 122 and the second side wall 118 includes a second recess 136 adjacent to the second intermediate portion 124. The first and second recesses 134, 136 are similar to each other. Further, a width of each recess 134 and 136 gradually increases from a top end of the impact absorber assembly to a bottom end of the of the impact absorber assembly 108.

With continued reference to FIGS. 2-4, the impact absorber assembly 108 includes a third wall 138 that extends between the first side wall 116 and the second side wall 118 and runs along the width W of the impact absorber assembly 108. The third wall 138 supports the first side wall 116 and the second side wall 118 to maintain the structural integrity of the impact absorber assembly 108 during an impact. The third wall 138 is sized, shaped, and arranged to dissipate energy to the first side wall 116 and the second side wall 118 during an impact. In some embodiments, the third wall 138 can dissipate energy of an impact, such as, for example, puncture contact, by distributing loading on a surface of the third wall 138.

The impact absorber assembly 108 also includes a base strap 140. The base strap 140 is generally sized, shaped, and arranged to prevent, mitigate, or restrict the folds in the intermediate portions 122, 124 from undesirably opening, and which facilitates transfer of loading in the event of an impact. In one embodiment, the base strap 140 includes a plurality of flanges, such as a first base flange 142a, a second base flange 142b, a third base flange 142c, collectively referred to as base flange 142. The first base flange 142a, the second base flange 142b, and the third base flange 142c are shown in detail in FIG. 3. The first base flange 142a and the second base flange 142b are disposed adjacent to the third wall 138 and extend laterally outward from the third wall 138 and are parallel to each other. Further, the third base flange 142c extends between the first base flange 142a and the second base flange 142b, coupling the first and second base flanges 142a and 142b. The first, second, and third base flanges 142a, 142b and 142c are coupled to each other to define a base opening 144 that is sized and shaped to provide access to the cavity 120.

The impact absorber assembly 108 includes a first coupling flange 142d and a second coupling flange 142e. The first coupling flange 142d extends outwardly from the second base flange 142b and the second coupling flange 142e extends outwardly from the third wall 138. The first and second coupling flanges 142d, 142e are configured to couple the impact absorber assembly 108 to the fitting 106. As shown in FIG. 2, the coupling flanges 142d and 142e angularly protrude out with respect to a central vertical axis of the impact absorber assembly 108. In one embodiment, interior surfaces of the coupling flanges 142d and 142e abut or mate with the fitting 106. In one embodiment, the coupling flanges 142d and 142e can be coupled to the fitting 106 via fasteners, welding, or other suitable coupling structures.

The impact absorber assembly 108 also includes an end strap 152 disposed at an end of the impact absorber assembly 108, which end is opposite to the end at which the base strap 140 is located. The first side wall 116 and the second side wall 118 extend between the base strap 140 and the end strap 152 along a portion of the length L of the impact absorber assembly 108.

The end strap 152 includes a plurality of end flanges, in particular, a first end flange 154a, a second end flange 154b, and a third end flange 154c, collectively referred to as end flange 154. The first end flange 154a extends outwardly from the third wall 138, and the second end flange 154b extends outwardly from the third wall 138 parallel to the first end flange 154a. The third end flange 154c extends laterally to the first end flange 154a and the second end flange 154b connecting the first end flange 154a to the second end flange 154b. The first, second, and third end flanges 154a, 154b and 154c are coupled to each other to define an end opening 156 that provides access to the cavity 120.

In one embodiment, the impact absorber assembly 108 includes a core 162. The core 162 is generally sized and shaped to wrap around a portion of the conduit 104. The core 162, in conjunction with the frame 114, absorbs the energy of an impact to the fitting 106 or conduit 104. The core 162, in some embodiments, can comprise Polyurethane foam (PU foam), or any other suitable material that can facilitate absorbing energy of an impact.

In one embodiment, the core 162 is positioned in the cavity 120, with the frame 114 surrounding the core 162. As shown in FIGS. 2 and 3 in detail, at least a portion of the core 162 protrudes out of the frame 114 through the end opening 156. The cavity 120 is shaped and sized to receive the core 162, and the base opening 144 and the end opening 156 are also sized to allow the core 162 to be inserted in the frame 114. In one embodiment, when the core 162 is inserted into the opening 144, the core 162 makes contact with the inner surfaces of the base flanges 142a, 142b and 142c and the end flanges 154a, 154b and 154c. In one embodiment, the core 162 includes a core aperture 164 that is sized and shaped to receive the conduit 104.

Figure 5A:
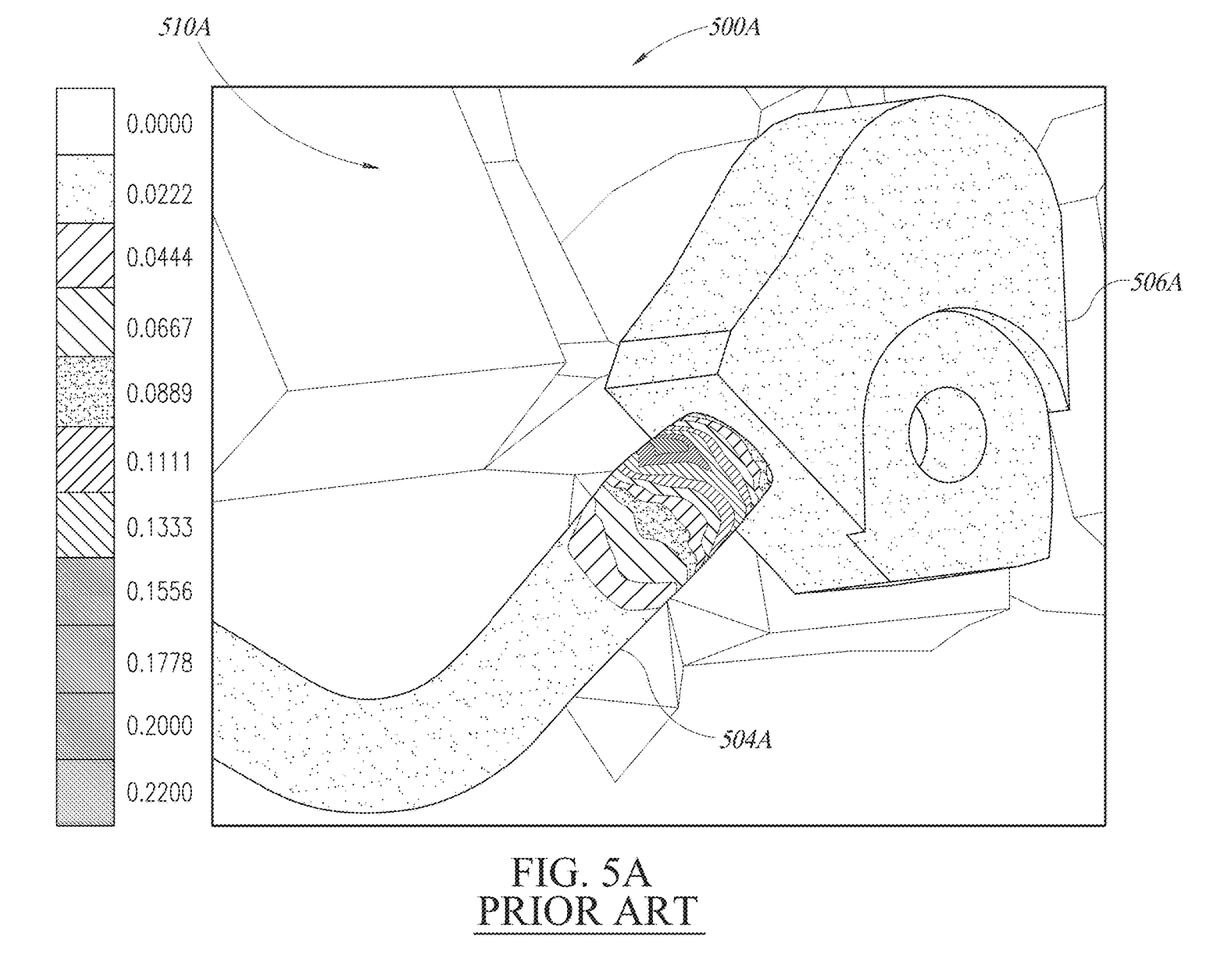
FIG. 5A is a plastic strain map of a conventional fitting assembly with a conduit of the conventional fitting assembly under contact.
Figure 5B:
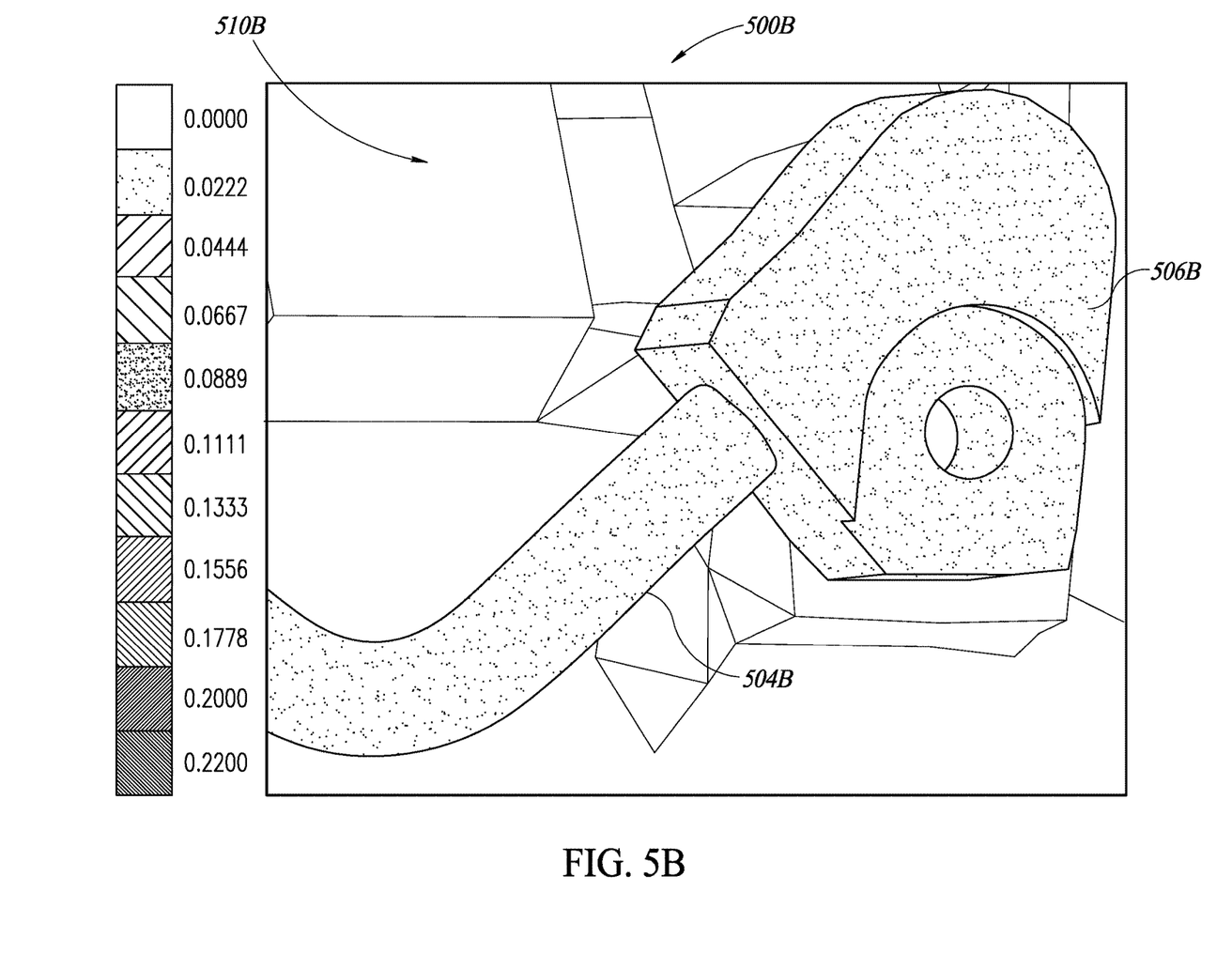
FIG. 5B is a plastic strain map of an impact absorber assembly, according to an embodiment of the present disclosure, with a conduit of the impact absorber assembly under contact, and with an impact absorber assembly according to an embodiment of the present disclosure removed for clarity of description and illustration.

As described above, the impact absorber assembly 108 reduces, mitigates, or limits the strains experienced by the conduit 104 or the fitting 106. FIG. 5A illustrates a plastic strain map 500A of a conventional fitting assembly 510A that includes a conduit 504A and a fitting 506A. FIG. 5B illustrates a plastic strain map 500B of a fitting assembly 510B, according to an embodiment of the present disclosure, that includes a conduit 504B and a fitting assembly 502B and an impact absorber assembly 108 according to an embodiment; however, the impact absorber assembly 108 is not shown for clarity of illustration and description. To generate the plastic strain maps 500A, 500B, a contact load is applied to a component that couples to the conduit 504A, 504B, which induces tension in the conduit 504A, 504B and the fitting 506A, 506B of the fitting assembly 502A, 502B.

As shown in FIG. 5A, the conduit 504A experiences plastic strain that varies along a length of the conduit 504A. In some regions, the value of strain is as high as 0.22, and in other regions proximate to a where the conduit 504A couples to the fitting 506A, plastic strain values range from between 0.22 to 0.15. As shown in FIG. 5B, when an impact absorber assembly 108, according to an embodiment of the present disclosure is provided, the plastic strain value across the conduit 504 and the fitting 506 is reduced, and does not exceed about 0.0222.

Figure 6A:
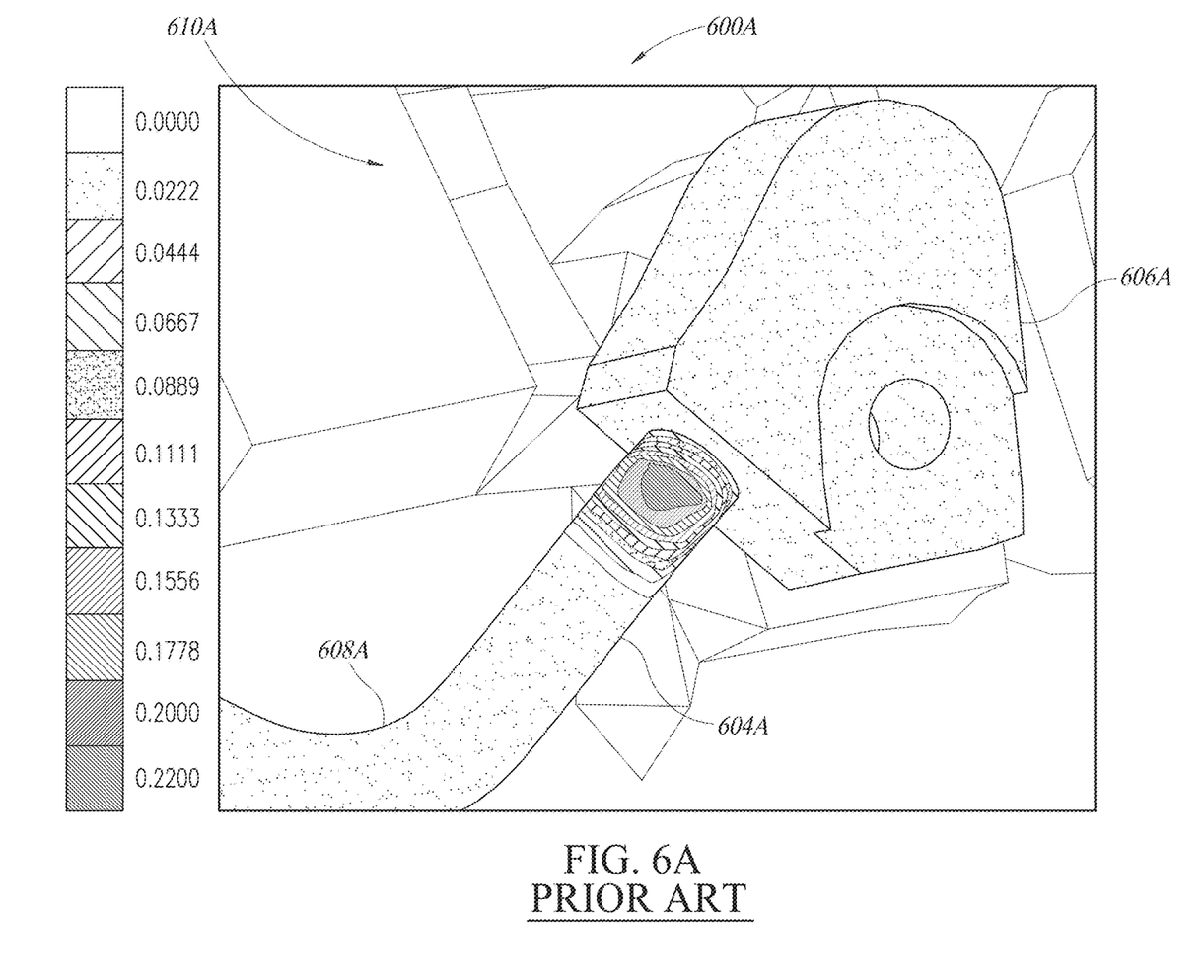
FIG. 6A is a plastic strain map of a conventional fitting assembly with a conduit of the conventional fitting assembly under external bending.
Figure 6B:
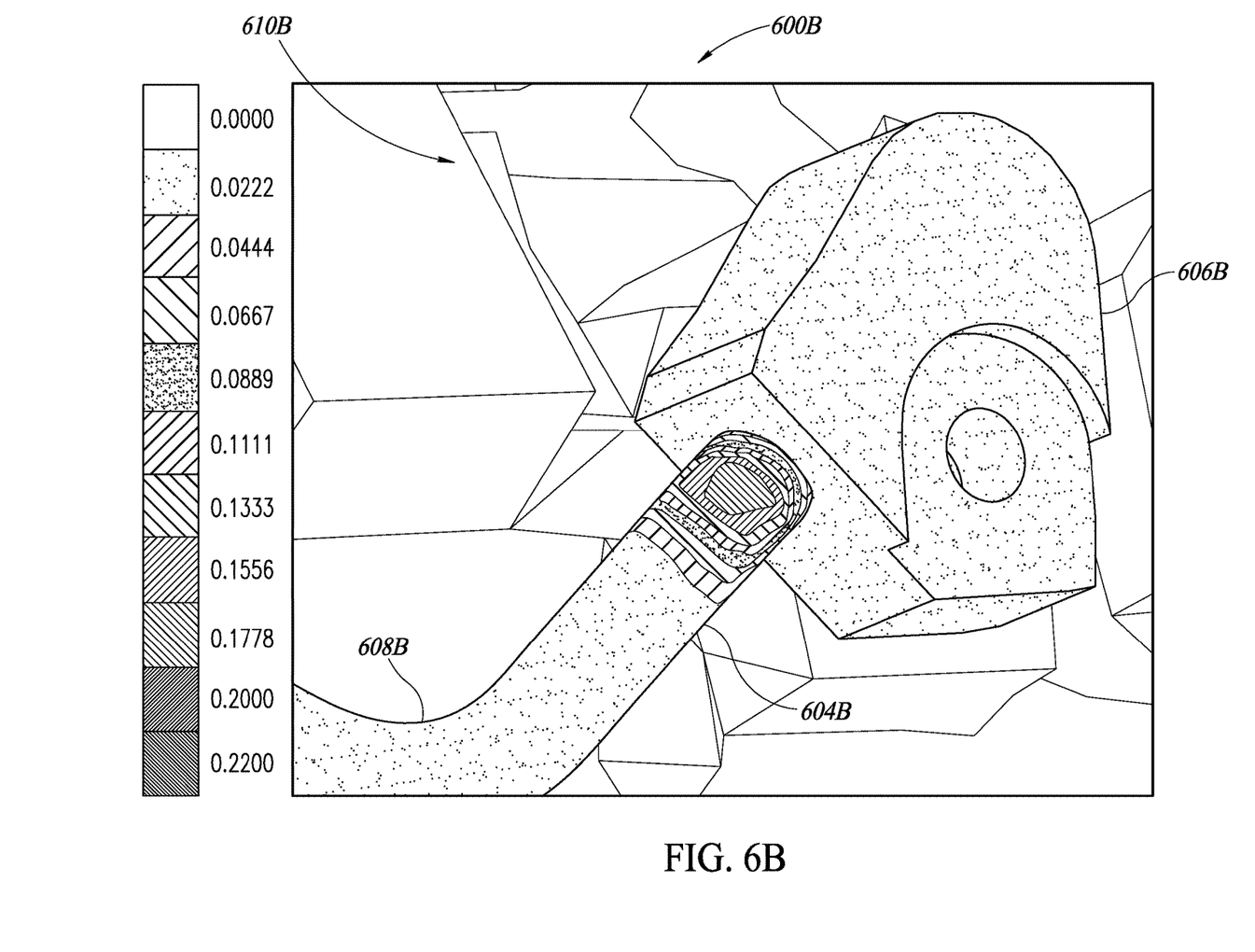
FIG. 6B is a plastic strain map of an impact absorber assembly, according to an embodiment of the present disclosure, with a conduit of the impact absorber assembly under external bending, and with an impact absorber assembly according to an embodiment of the present disclosure removed for clarity of description and illustration.

FIG. 6A illustrates a plastic strain map 600A of a conventional fitting assembly 610A that includes a conduit 604A and a fitting 606A. FIG. 6B illustrates a plastic strain map 600B of a fitting assembly 610B, according to an embodiment of the present disclosure, that includes a conduit 604B and a fitting 606B and an impact absorber assembly 108 according to an embodiment; however, the impact absorber assembly 108 is not shown for clarity of illustration and description under external bending according to an embodiment. To generate the plastic strain maps 600A, 600B, the conduits 604A, 604B were subjected to external bending by applying a load proximate to a bend region 608A, 608B.

As shown in FIG. 6A, the plastic strain values proximate to a region where the fitting 606A and the conduit 604A are coupled are as high as 0.22 and vary up to 0.1778. By contrast, as shown in FIG. 6B, when an impact absorber assembly 108 according to an embodiment of the present disclosure is provided, the plastic strain values do not exceed 0.1778.

The various embodiments described above can be combined to provide further embodiments. Moreover, these and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. An apparatus, comprising:
   a conduit; and
   an impact absorber assembly, including:
      a core having an aperture that receives the conduit; and
      a frame having:
         a cavity that is sized and shaped to receive the core;
         a first side wall;
         a second side wall, the first and second side walls spaced apart to, at least in part, define the cavity;
         a third wall that extends between the first and second side walls; and
         a base strap extending outwardly from the third wall and coupled to the first and second side walls.

2. The apparatus of claim 1 wherein the base strap includes:
   a first base flange extending outwardly from the third wall;
   a second base flange extending outwardly from the third wall; and
   a third base flange extending between the first and second base flanges.

3. The apparatus of claim 1 wherein the frame further comprises:
   an end strap extending outwardly from the third wall and coupled to the first and second side walls.

4. The apparatus of claim 3 wherein the end strap includes:
   a first end flange extending outwardly from the third wall;
   a second end flange extending outwardly from the third wall; and
   a third end flange extending between the first and second end flanges.

5. The apparatus of claim 1 wherein the first side wall includes a first intermediate portion having a waveform shape.

6. The apparatus of claim 5 wherein the waveform shape includes at least a pair of ridges and a trough between the pair of ridges.

7. The apparatus of claim 5 wherein the first side wall includes a first recess adjacent to the first intermediate portion.

8. The apparatus of claim 1 wherein the second side wall includes a second intermediate portion having a waveform shape.

9. The apparatus of claim 8 wherein the waveform shape includes at least a pair of ridges and a trough between the pair of ridges.

10. The apparatus of claim 1 wherein the frame includes at least one coupling flange which connects the frame to a fitting.

11. An impact absorber assembly, comprising:
    a core; and
    a frame having:
       a cavity that is sized and shaped to receive the core;
       a first side wall;
       a second side wall spaced apart from the first side wall, at least one of the first side wall or the second side wall having an intermediate portion that includes a waveform shape;
       a third wall;
       a base strap extending outwardly from the third wall and coupled to the first and second side walls; and
       an end strap extending outwardly from the third wall and coupled to the first and second side walls.

12. The impact absorber assembly of claim 11 wherein the waveform shape includes at least a pair of ridges and a trough between the pair of ridges.

13. The impact absorber assembly of claim 11 wherein the core comprises polyurethane foam.

14. An apparatus, comprising:
    an air conditioning conduit of a vehicle;
    a fitting in fluid communication with the air conditioning conduit; and
    an impact absorber assembly, including:
       a core having an aperture that receives the air conditioning conduit; and
       a frame coupled to the fitting, the frame having:
          a cavity that is sized and shaped to receive the core;
          a first side wall;
          a second side wall, the first and second side walls spaced apart to, at least in part, define the cavity;
          a third wall;
          a base extending outwardly from the third wall and coupled to the first and second side walls; and
          an end strap extending outwardly from the third wall and coupled to the first and second side walls.

15. The apparatus of claim 14 wherein at least one of the first side wall or the second side wall has an intermediate portion that includes a waveform shape.

16. The apparatus of claim 15 wherein the waveform shape includes at least a pair of ridges and a trough between the pair of ridges.

* * * * *

UNITED STATES PATENT AND TRADEMARK OFFICE
CERTIFICATE OF CORRECTION

| | | |
|---|---|---|
| PATENT NO. | : 11,898,687 B2 | Page 1 of 1 |
| APPLICATION NO. | : 16/993864 | |
| DATED | : February 13, 2024 | |
| INVENTOR(S) | : Ramírez | |

It is certified that error appears in the above-identified patent and that said Letters Patent is hereby corrected as shown below:

In the Claims

Column 8:
Claim 14, Line 39;
After "base" insert -- strap --.

Signed and Sealed this
Second Day of April, 2024

*Katherine Kelly Vidal*

Katherine Kelly Vidal
*Director of the United States Patent and Trademark Office*